(12) United States Patent
Kim et al.

(10) Patent No.: US 8,667,481 B2
(45) Date of Patent: Mar. 4, 2014

(54) SENSOR NODE INCLUDED IN SENSOR NETWORK, UPDATE SERVER UPDATING THE SAME, AND METHOD OF UPDATING SENSOR NODE

(75) Inventors: Bong Wan Kim, Daejeon-si (KR); Jae Hong Ruy, Daejeon-si (KR); Seong-Soon Joo, Daejeon-si (KR); Jong-Suk Chae, Daejeon-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 709 days.

(21) Appl. No.: 12/630,328

(22) Filed: Dec. 3, 2009

(65) Prior Publication Data

US 2010/0153088 A1    Jun. 17, 2010

(30) Foreign Application Priority Data

Dec. 15, 2008 (KR) .................. 10-2008-0127260

(51) Int. Cl.
*G06F 9/44* (2006.01)

(52) U.S. Cl.
USPC ........... 717/173; 717/120; 717/168; 717/170; 717/171; 717/172; 703/22; 709/201; 709/202; 709/203; 709/219; 709/220; 709/221; 709/223

(58) Field of Classification Search
None
See application file for complete search history.

(56) References Cited

U.S. PATENT DOCUMENTS

| | | | |
|---|---|---|---|
| 7,216,342 B2 * | 5/2007 | Southwell et al. ............ | 717/162 |
| 7,320,030 B2 | 1/2008 | Brown .......................... | 709/224 |
| 7,378,962 B2 * | 5/2008 | Odenwald et al. ........ | 340/539.22 |
| 7,395,195 B2 * | 7/2008 | Suenbuel et al. ............... | 703/13 |
| 7,761,561 B2 * | 7/2010 | Muro et al. .................... | 709/224 |
| 7,991,915 B2 * | 8/2011 | Polastre et al. ............... | 709/246 |
| 8,107,397 B1 * | 1/2012 | Bagchi et al. ................. | 370/254 |
| 8,135,963 B2 * | 3/2012 | Sato et al. ..................... | 713/190 |
| 2004/0153825 A1 * | 8/2004 | Morimoto et al. .............. | 714/38 |
| 2004/0260734 A1 * | 12/2004 | Ren et al. ..................... | 707/203 |
| 2006/0155818 A1 * | 7/2006 | Odenwald et al. ............ | 709/208 |
| 2006/0253570 A1 * | 11/2006 | Biswas et al. ................. | 709/224 |
| 2007/0016629 A1 * | 1/2007 | Reinsch ........................ | 707/203 |

(Continued)

FOREIGN PATENT DOCUMENTS

CN    101001186 A  *  7/2007
KR    10-0799567       6/2007

OTHER PUBLICATIONS

'Remote Incremental Linking for Energy-Efficient Reprogramming of Sensor Networks' by Joel Koshy and Raju Pandey, copyright 2005, IEEE.*

(Continued)

*Primary Examiner* — Steven Snyder
(74) *Attorney, Agent, or Firm* — Staas & Halsey LLP

(57) ABSTRACT

Provided are a sensor node included in a sensor network, an update server updating the sensor node, and a method of updating a sensor node. The update server updating a sensor node included in a sensor network includes an execution code manager managing execution codes for a plurality of sensor nodes included in the sensor network, a rule generator generating an update rule based on a result of comparing an existing execution code managed by the execution code manager with an update execution code required for a new function update of the sensor node, and a downloader causing the sensor node to download the update rule generated by the rule generator. Accordingly, an execution code can be updated by a small amount of data transmission.

18 Claims, 9 Drawing Sheets

(56) References Cited

U.S. PATENT DOCUMENTS

2007/0169086 A1* 7/2007 Cheng et al. .................. 717/168
2008/0071892 A1* 3/2008 Muro et al. ................... 709/221
2008/0162949 A1* 7/2008 Sato et al. ..................... 713/194
2009/0276484 A1* 11/2009 Polastre et al. ............... 709/202

OTHER PUBLICATIONS

'Reprogramming Wireless Sensor Networks with a Selective and Incremental Approach' by Issac Noe Garcia Garza and J. Antonio Garcia-Macias, from 2008 5th International Conference on Electrical Engineering.*

'Efficient Incremental Code Update for Sensor Networks' by Panta et al., Purdue University, ACM Transactions on Sensor Networks, vol. 7, No. 4, Article 30, Publication date: Feb. 2011.*

'Zephyr: Efficient Incremental Reprogramming of Sensor Nodes using Function Call Indirections and Difference Computation' by Rajesh Krishna Panta et al., Purdue University, USENIX'09 Proceedings of the 2009 conference on USENIX Annual technical conference.*

* cited by examiner

SENSOR NODE INCLUDED IN SENSOR NETWORK, UPDATE SERVER UPDATING THE SAME, AND METHOD OF UPDATING SENSOR NODE

CROSS-REFERENCE TO RELATED APPLICATION

This application claims the benefit under 35 U.S.C. §119 (a) of Korean Patent Application No. 10-2008-0127260, filed on Dec. 15, 2008, the disclosure of which is incorporated by reference in its entirety for all purposes.

BACKGROUND

1. Field

The following description relates to updating a sensor node included in a sensor network, and more particularly, to a sensor node included in a sensor network, an update server updating the sensor node, and a method of updating a sensor node.

2. Description of the Related Art

In general, a sensor network that connects sensor nodes installed in an environment involving the sensors in measurement is used to collect values measured by the sensors. Sensor networks are installed in various environments. Thus, an installation environment may be different from an environment for which the corresponding sensor network is originally designed, or a program installed in a sensor node may not match with an environment because the environment varies as time goes on. In this case, information collected by a sensor according to an unsuitable program for an actual environment may have low usefulness.

This problem can be solved by newly installing a suitable program for a current environment in a sensor node. However, it is difficult to install a new program in the already-installed sensor nodes one by one. To this end, a method of wirelessly installing the new program is needed. Since such a method uses limited wireless resources, it is necessary to transfer a new program to sensor nodes using as small amount of transmission as possible.

According to conventional art, a script-level change is made to update each sensor node with an appropriate execution code. Otherwise, execution codes for various uses are prepared for execution in each sensor node, and a server manages the execution codes and instructs appropriate execution.

Even if an execution code needs to be downloaded for an update, a sensor node downloads the entire execution code. While enabling execution of a desired program, such a method excessively uses limited network resources. Thus, the method puts a heavy load on an operating network and is difficult to use.

SUMMARY

The following description relates to a sensor node update method that allows a sensor node to download an execution code having a new function from an update server and execute a program having the new function while enabling a partial update method of comparing the execution code with an existing execution code and transferring the execution code with the minimum communication load.

According to an exemplary aspect, there is provided an update server updating a sensor node included in a sensor network, including: an execution code manager managing execution codes for a plurality of sensor nodes included in the sensor network; a rule generator generating an update rule based on a result of comparing an existing execution code managed by the execution code manager with an update execution code required for a new function update of the sensor node; and a downloader causing the sensor node to download the update rule generated by the rule generator.

The update server further includes: a virtual sensor node having the same execution-code execution environment as the sensor node; and a simulator providing the update rule generated by the rule generator to the virtual sensor node and performing a simulation.

The downloader selects an update rule involving the least amount of transmission from among the one or more update rules generated by the rule generator according to the result of the simulation performed by the simulator, and causes the sensor node to download the selected update rule.

The rule generator generates the update rule in the form of a function address table (FAT) about the existing execution code and the update execution code.

According to another exemplary aspect, there is provided a sensor node included in a sensor network, including: a rule receiver receiving an update rule that is generated by comparing existing execution codes with an update execution code required for a new function update of the sensor node to minimize transmission of the execution code, from an update server; and an updater interpreting the update rule received by the rule receiver and updating previously stored execution codes.

According to still another exemplary aspect, there is provided a sensor node update method performed in an update server, including: managing execution codes for a plurality of sensor nodes included in a sensor network; comparing the managed existing execution codes with an update execution code required for a new function update of the sensor nodes, and generating an update rule to minimize transmission of the execution code; and causing a corresponding sensor node to download the generated update rule.

According to yet another exemplary aspect, there is provided a sensor node update method performed in a sensor node, including: receiving an update rule that is generated by comparing existing execution codes with an update execution code required for a new function update of the sensor node to minimize transmission of the execution code, from an update server; and interpreting the received update rule and updating previously stored execution codes.

Additional aspects of the invention will be set forth in the description which follows, and in part will be apparent from the description, or may be learned by practice of the invention.

It is to be understood that both the foregoing general description and the following detailed description are exemplary and explanatory and are intended to provide further explanation of the invention as claimed.

BRIEF DESCRIPTION OF THE DRAWINGS

Elements, features, and structures are denoted by the same reference numerals throughout the drawings and the detailed description, and the size and proportions of some elements may be exaggerated in the drawings for clarity and convenience.

DETAILED DESCRIPTION

The detailed description is provided to assist the reader in gaining a comprehensive understanding of the methods, apparatuses and/or systems described herein. Various changes, modifications, and equivalents of the systems, apparatuses, and/or methods described herein will likely suggest themselves to those of ordinary skill in the art. Also, descriptions of well-known functions and constructions are omitted to increase clarity and conciseness.

Figure 1:
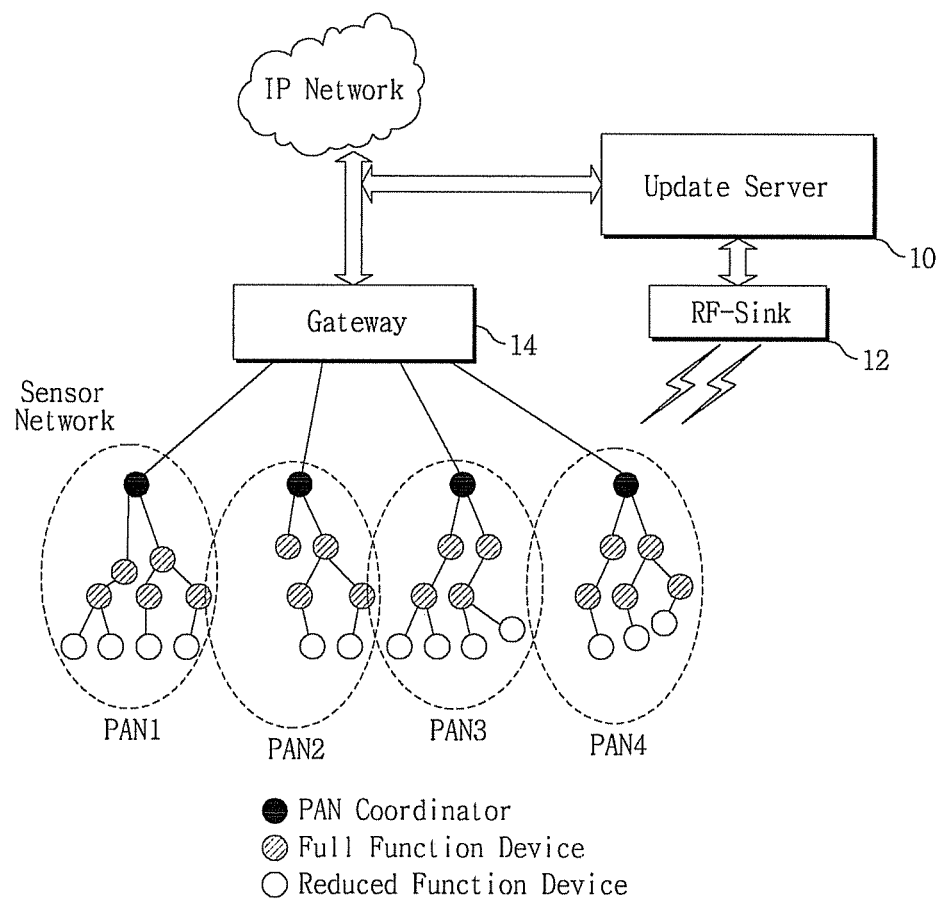
FIG. 1 is a block diagram of an example of an entire network system including a sensor network.

FIG. 1 is a block diagram of an example of an entire network system including a sensor network.

The sensor network may be connected with the external Internet through a gateway 14. As illustrated in FIG. 1, the sensor network includes various types of nodes. In this exemplary embodiment, the nodes may be connected in the form of a tree-based connection structure. In general, a sensor network includes reduced function devices (RFDs) that are nodes having a limited function excluding a routing function, full function devices (FFDs) that are nodes having the routing function, and a personal area network (PAN) coordinator that manages the RFDs and the FFDs as one PAN.

A FFD can communicate with another FFD and a RFD, while a RFD can communicate with a FFD only but not with another RFD. RFDs have the minimum resources and memory and thus are used as end devices of sensor nodes, and so on.

When the nodes in the sensor network want to communicate with outside, the gateway 14 serves as a passage through which the nodes and the outside are connected. The sensor network can communicate with the external Internet through the gateway 14.

An update server 10 is connected with the sensor network via the Internet using an Internet protocol (IP) network. In this exemplary embodiment, the update server 10 may manage update data according to nodes of the sensor network. The update server 10 is connected with the sensor network through not only an existing network. The update server 10 may be directly connected with the sensor network through, for example, a radio frequency (RF)-sink device 12.

Figure 2:
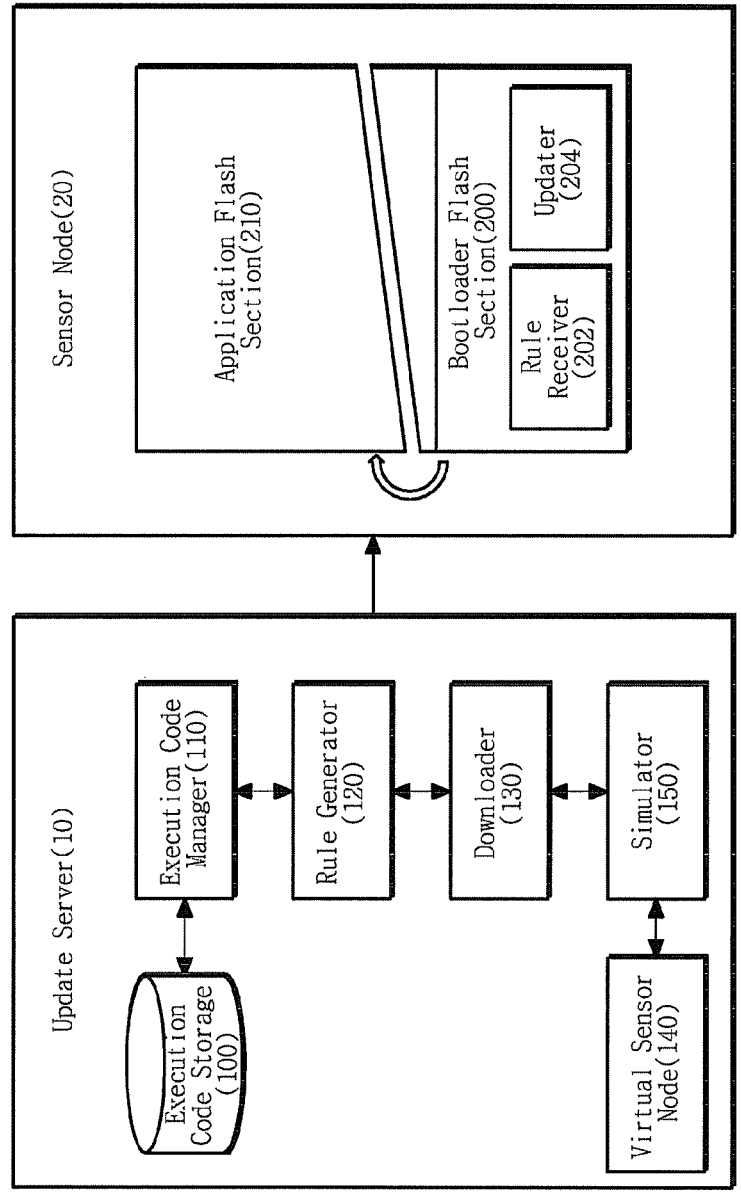
FIG. 2 is a block diagram of an update server and a sensor node according to an exemplary embodiment.

FIG. 2 is a block diagram of an update server and a sensor node according to an exemplary embodiment.

An update server 10 includes an execution code storage 100, an execution code manager 110, a rule generator 120, a downloader 130, a virtual sensor node 140, and a simulator 150.

The execution code storage 100 stores execution codes for respective nodes. The execution code manager 110 may manage execution codes executed in nodes included in a sensor network.

When a specific node needs to be updated with a new execution code, the rule generator 120 recompiles a current execution code or selects an execution code that has been already compiled and prepared. And, the execution code manager 110 recognizes the current execution code of the node stored in the execution code storage 100 and performs an entire execution code update process.

The rule generator 120 compares the current execution code of the node with the updated execution code, and generates an update rule whereby the sensor node can be updated by the least amount of transmission using the virtual sensor node 140.

The downloader 130 processes update rules generated by the rule generator 120 in the form of a packet and transfers the packet to a sensor node 20.

The simulator 150 performs a simulation in the virtual sensor node 140 as if the update rule was transmitted to the actual sensor node 20. After this, the rule generator 120 can select an effective rule according to the simulation result of the simulator 150, and may check whether the execution code is correctly updated when the final rule is applied. In an exemplary embodiment, the downloader 130 first checks the simulation result of the simulator 150 and then transfers the update rule to the sensor node 20.

The sensor node 20 includes a rule receiver 202 and an updater 204.

The rule receiver 202 receives update rules from the update server 10.

The updater 204 interprets the update rules received by the rule receiver 202 and reflects them in a program memory.

In this exemplary embodiment, the rule receiver 202 and the updater 204 are located in a bootloader flash section 200, and the updater 204 reflects an update rule that is received by the rule receiver 202 and interpreted in an application flash section 210.

An update process will be described in detail below with reference to FIGS. 3 to 8.

Figure 3:
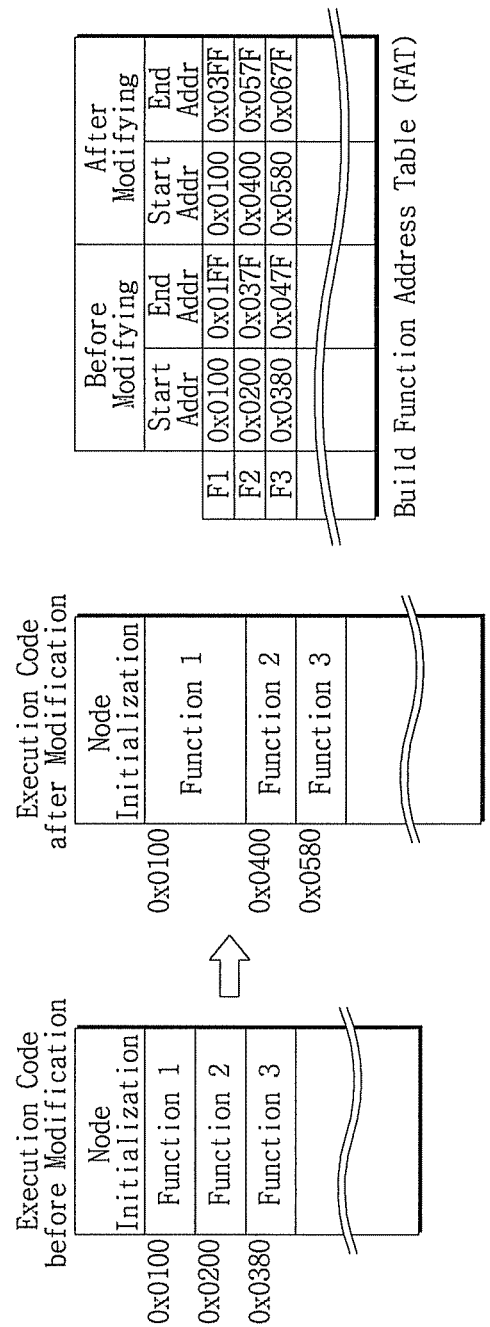
FIG. 3 illustrates a process of generating an update rule according to an exemplary embodiment.

FIG. 3 illustrates a process of generating an update rule according to an exemplary embodiment.

As shown in the drawing, an update rule may be in the form of a function address table (FAT). In this exemplary embodiment, the rule generator 120 builds a FAT about a change in the positions of execution functions of an execution code using a function map file, etc., generated when an execution code before modification and an execution code after modification are compiled.

Figure 4:
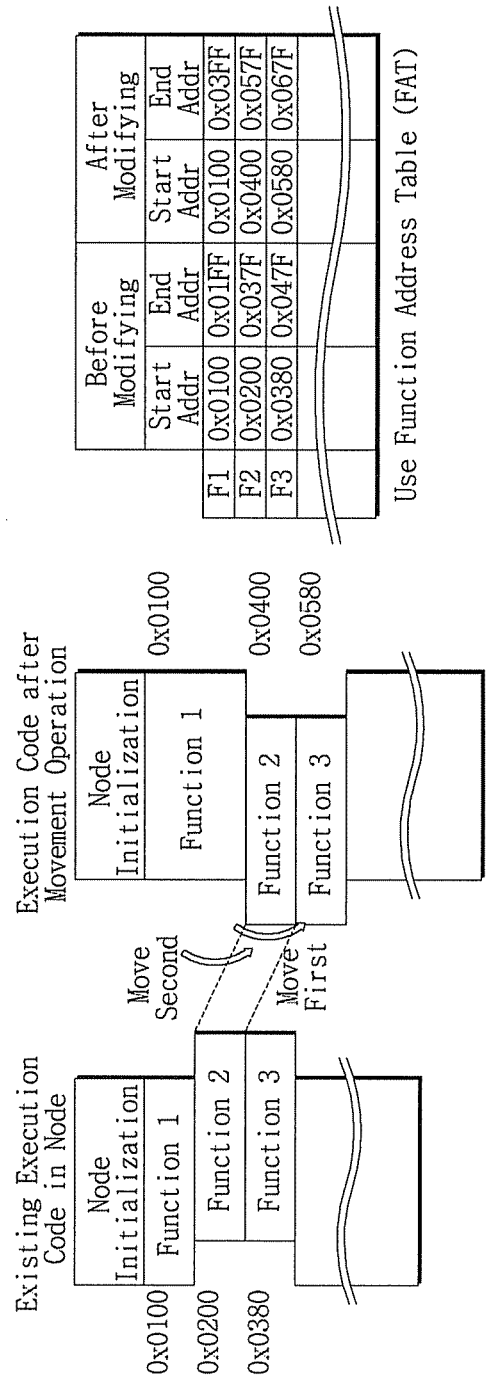
FIG. 4 illustrates an update process conforming to an update rule in a sensor node according to an exemplary embodiment.

FIG. 4 illustrates an update process conforming to an update rule in a sensor node according to an exemplary embodiment.

In this exemplary embodiment, the updater 204 of the sensor node 20 receives a FAT from the downloader 130 of the update server 10. And, the updater 204 included in the bootloader of the sensor node 20 moves the execution code of each function based on the FAT. Here, when execution codes are moved downward, in which a memory address increases, in a program memory space, the movement operation is performed upward beginning with the lowermost address of the last function in order to prevent overwriting caused by the movement operation. In other words, when a function execution code is moved in an arrow direction (downward), the movement operation is performed in a decreasing memory address order, that is, Function 3 and Function 2. On the other hand, when execution codes are moved in a direction in which an address decreases, the movement operation is performed beginning with the uppermost function and ending with the lowermost function. Likewise, in the same function, the movement operation is performed beginning with data having the smallest address value.

Figure 5:
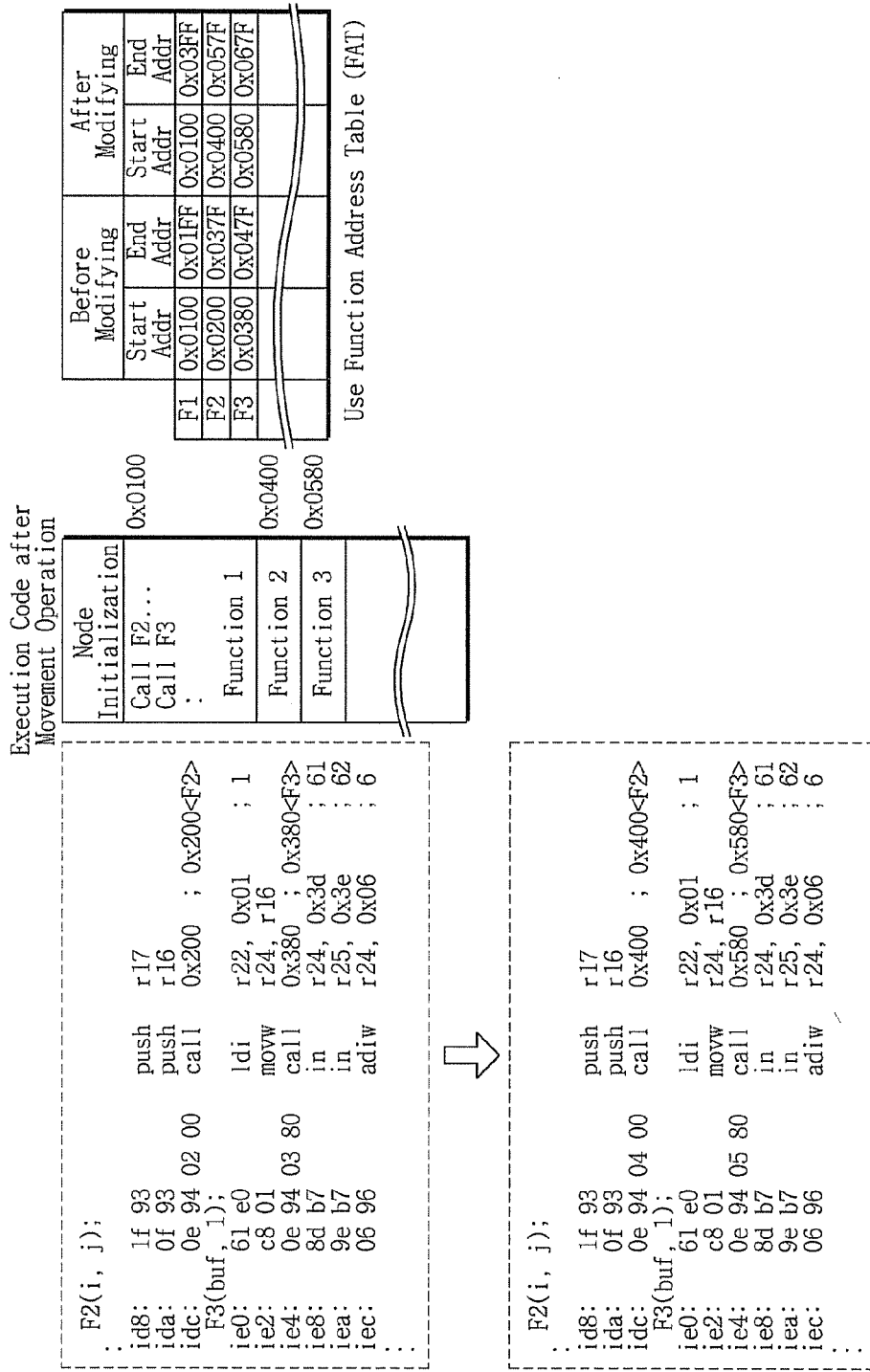
FIG. 5 illustrates a function call code changed in a sensor node according to an exemplary embodiment.

FIG. 5 illustrates a function call code changed in a sensor node according to an exemplary embodiment.

The updater 204 of the sensor node 20 updates a function call code based on a FAT received from the update server 10. As illustrated in FIG. 5, the start address of Function 2 is changed from 0x0200 to 0x0400. Thus, a call address must be changed from 0x0200 to 0x0400 in the execution code of call F2. In other words, the updater 204 updates an execution code based on a FAT such that a call can be made to a moved function position.

In an operation code (opcode) expressing a machine language instruction of an execution code for an actual sensor node, a call address may be indicated not by its real address value but by an address value modified through a bit operation according to a predetermined rule. In this case, after the same bit operation is performed on the call address value, a call can be made to a moved function position based on a FAT suggested in an exemplary embodiment.

Figure 6:
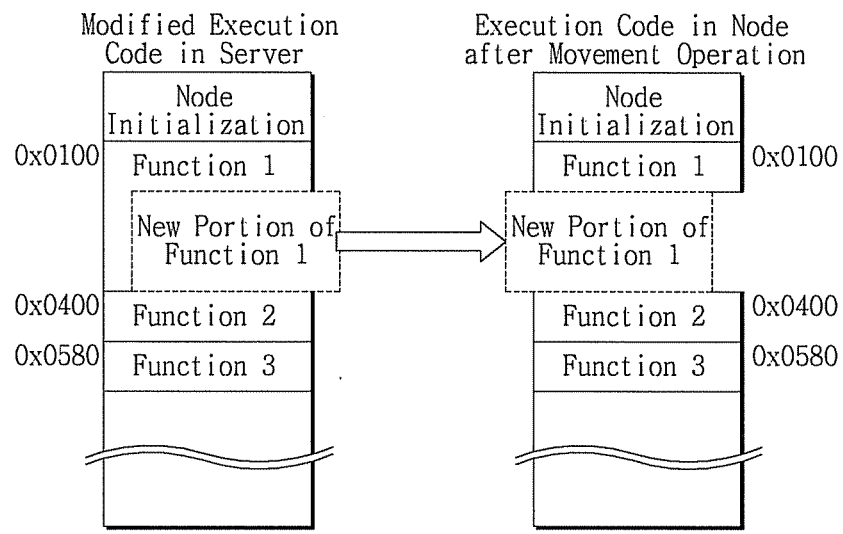
FIG. 6 illustrates an execution code addition process in a sensor node according to an exemplary embodiment.

FIG. 6 illustrates an execution code addition process in a sensor node according to an exemplary embodiment.

When a newly added code is compiled, a new execution code for the code is added, which is not in an existing execution code. Thus, the update server 10 causes the sensor node 20 to download an execution code portion that needs to be added. The updater 204 checks an address in which the new execution code portion transmitted from the update server 10 will be reflected, and reflects the new execution code portion in a program memory.

Figure 7:
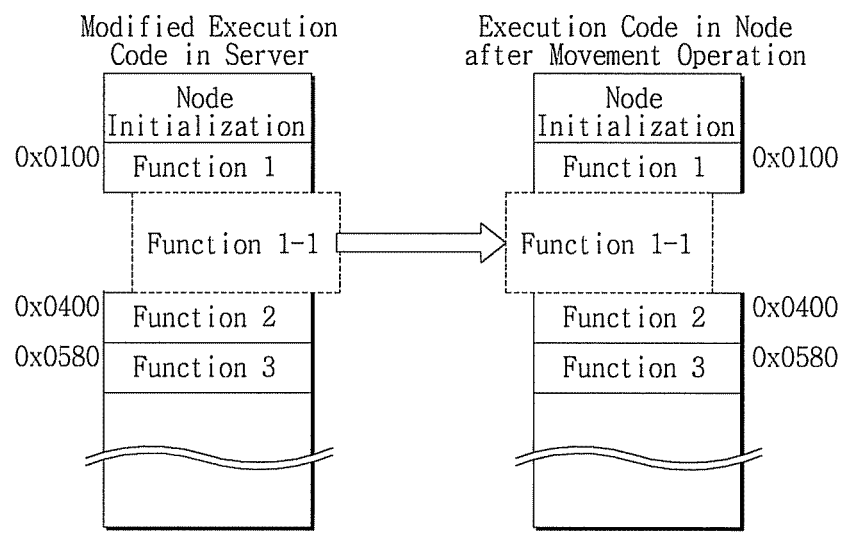
FIG. 7 illustrates a function addition process in a sensor node.

FIG. 7 illustrates a function addition process in a sensor node.

When an entire function is added, the updater 204 of the sensor node 20 reflects a function execution code received from the update server 10 in an existing execution code, like the case of FIG. 6 in which a function execution code portion is added.

Figure 8:
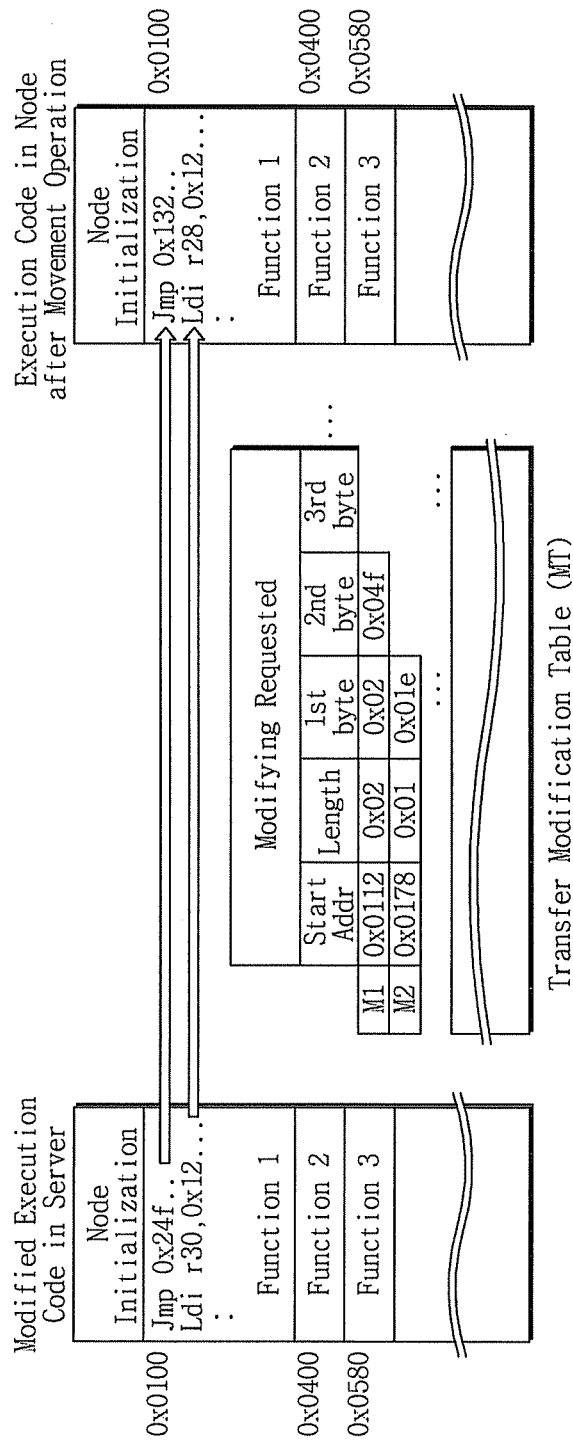
FIG. 8 illustrates an update code modification process in an update server according to an exemplary embodiment.

FIG. 8 illustrates an update code modification process in an update server according to an exemplary embodiment.

In this exemplary embodiment, the simulator 150 of the update server 10 simulates an update in the virtual sensor node 140 according to an update rule generated by the rule generator 120. An execution code under update is generated through the simulation in the virtual sensor node 140, and the rule generator 120 compares the execution code under update generated by the virtual sensor node 140 with an updated execution code that is the final goal. When an unlike portion is detected by the comparison operation, it is recorded as a modification table (MT), and the MT is transmitted to the actual sensor node 20 such that the unlike portion is reflected in a program memory.

By performing a simulation using the virtual sensor node 140, it is possible to execute an update rule before transmitting the rule to the actual sensor node 20 and check the result. In other words, simulations are performed for a case in which all rules are executed and another case in which the rules are partially applied, such that a method involving the least amount of transmission can be selected. When an update rule is transmitted according to the selected method, it is also possible to check whether an execution code is changed into an updated execution code, the final goal. An update rule according to a method involving the least amount of transmission selected by such a simulation is transmitted to the actual sensor node 20, thereby saving network resources and effectively updating an execution code.

Figure 9:
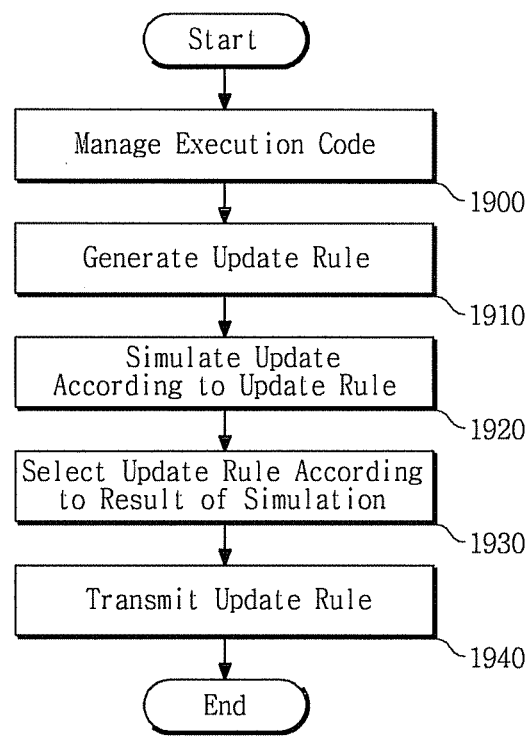
FIG. 9 is a flowchart illustrating a sensor node update method performed in an update server according to an exemplary embodiment.

FIG. 9 is a flowchart illustrating a sensor node update method performed in an update server according to an exemplary embodiment.

First, an update server stores execution code for respective nodes of a sensor network and manages an execution code executed in the sensor nodes (operation 1900). After this, when an execution code needs to be updated for some reason, for example, in order to add a function to a sensor node, the update server generates an update rule for the sensor node (operation 1910). At this time, the update server may compare a current execution code of the sensor node with an updated execution code and generate an update rule whereby the sensor node can be updated using the least amount of transmission.

Subsequently, an update is simulated according to the generated update rule in a virtual node of the update server (operation 1920). Then, an update rule whereby the update can be performed using the least amount of transmission may be selected (operation 1930). After this, the update server processes the selected update rule in the form of a packet and transmits the packet to the sensor node (operation 1940).

Figure 10:
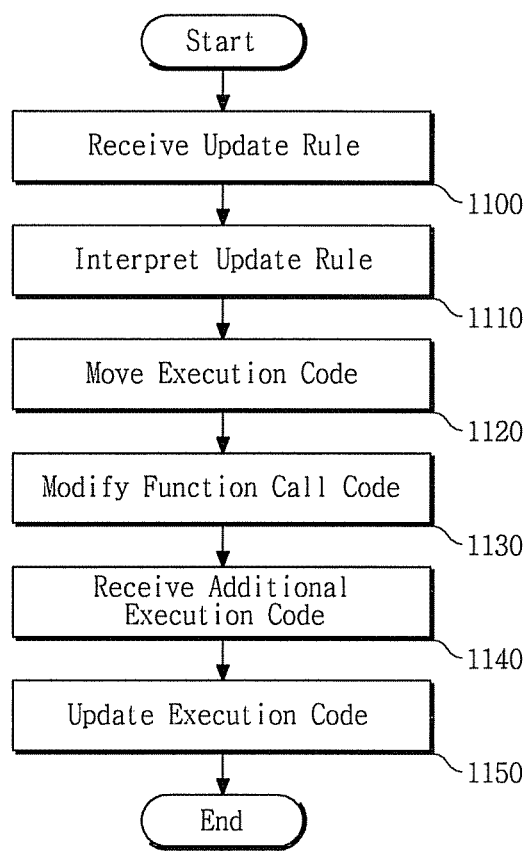
FIG. 10 is a flowchart illustrating a sensor node update method performed in a sensor node according to an exemplary embodiment.

FIG. 10 is a flowchart illustrating a sensor node update method performed in a sensor node according to an exemplary embodiment.

When a sensor node receives an update rule from an update server (operation 1100), it interprets the received update rule (operation 1110) and reflects the update rule in a program memory.

In this exemplary embodiment, the update rule may be in the form of a FAT. In other words, the update rule in the form of a FAT about a change in the positions of execution functions of an execution code may be interpreted using a function map file, etc., generated when an execution code before modification and an execution code after modification are compiled.

And, execution codes of respective functions are moved in a memory space based on the result of interpreting the FAT (operation 1120). Here, when the execution codes are moved downward, in which a memory address increases, in a program memory space, the movement operation is performed downwards beginning with the lowermost address of the last function in order to prevent overwriting caused by the movement operation. In other words, when a function execution code is moved in an arrow direction (downward), the movement operation is performed in a decreasing memory address order, that is, Function 3 and Function 2. On the other hand, when execution codes are moved in a direction in which an address decreases, the movement operation is performed beginning with the uppermost function and ending with the lowermost function. Likewise, in the same function, the movement operation is performed beginning with data having the smallest address value.

Thereafter, the sensor node updates a function call code based on the result of interpreting the update rule in the form of a FAT (operation 1130). It can be seen from FIG. 5 that the start address of Function 2 is changed from 0x0200 to 0x0400. Thus, a call address must be changed from 0x0200 to 0x0400 in the execution code of call F2. In other words, an execution code is updated based on a FAT such that a call can be made to a moved function position.

Also, when a newly added portion of a function execution code or a newly added entire function is compiled, a new execution code is added for the portion, which is not in an existing execution code. Thus, the sensor node downloads the new execution code portion that needs to be added from the update server. And, the sensor node checks an address in which the downloaded new execution code portion will be reflected, and reflects the new execution code portion in the program memory (operation 1140).

Subsequently, the update server compares a simulation result with an actual update result, and transmits a rule that is recorded as a MT when an unlike portion is detected to the actual sensor node. Then, the sensor node updates a portion to be modified in the program memory based on the received MT (operation 1150).

The present invention can be implemented as computer readable codes in a computer readable record medium. The computer readable record medium includes all types of record media in which computer readable data are stored. Examples of the computer readable record medium include a ROM, a RAM, a CD-ROM, a magnetic tape, a floppy disk, and an optical data storage. Further, the record medium may be implemented in the form of a carrier wave such as Internet transmission. In addition, the computer readable record medium may be distributed to computer systems over a network, in which computer readable codes may be stored and executed in a distributed manner.

As apparent from the above description, sensor networks may be applied to a variety of environments, and a program installed in sensor nodes included in a sensor network usually has to be executed for a long time. Thus, when the role of a sensor node is changed by environmental variance, a function is changed, or a problem is detected from an execution code, bug patch may be needed to solve the problem.

For this reason, a rule of changed parts is detected from an existing execution code executed in a sensor node and transferred such that the execution code can be updated by the network transmission of a small amount of data. In other words, it is possible to efficiently update a sensor node while minimizing the load of a sensor network.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. An update server updating a sensor node included in a sensor network, comprising:
   an execution code manager managing execution codes for a plurality of sensor nodes included in the sensor network;
   a rule generator generating an update rule based on a result of comparing an existing execution code managed by the execution code manager with an update execution code required for a new function update of the sensor node; and
   a downloader causing the sensor node to download the update rule generated by the rule generator,
   wherein the rule generator generates the update rule in the form of a function address table (FAT) containing starting and ending addresses of the existing execution code and the update execution code,
   wherein the rule generator generates the update rule in the form of a modification table (MT) including information about a memory requiring code modification based on the result of the simulation performed in the virtual node where the modification table includes addresses of bytes to be modified.

2. The update server of claim 1, further comprising:
   a virtual sensor node having the same execution-code execution environment as the sensor node; and
   a simulator providing the update rule generated by the rule generator to the virtual sensor node and performing a simulation.

3. The update server of claim 2, wherein the rule generator generates one or more update rules and the downloader selects an update rule involving the least amount of transmission from among the one or more update rules generated by the rule generator according to the result of the simulation performed by the simulator, and causes the sensor node to download the selected update rule.

4. The update server of claim 1, wherein the rule generator includes information of a function code added to a function updated based on the result of the comparison operation and information of an execution start address of the function in the update rule.

5. The update server of claim 2, wherein the rule generator generates the update rule in the form of a modification table (MT) including information about a memory requiring code modification based on the result of the simulation performed in the virtual node.

6. A sensor node included in a sensor network, comprising:
   a rule receiver receiving an update rule from an update server, the update rule is generated by comparing existing execution codes with an update execution code required for a new function update of the sensor node to minimize transmission of the execution code, where the update rule is in the form of a function address table (FAT) containing starting and ending addresses of the existing execution code and the update execution code; and
   an updater interpreting the update rule received by the rule receiver and updating previously stored execution codes,
   wherein the update rule is in the form of a modification table (MT) including information about a memory requiring code modification based on the result of the simulation performed in the virtual node where the modification table includes addresses of bytes to be modified.

7. The sensor node of claim 6, wherein the updater moves the previously stored execution codes of respective functions in a memory space based on the update rule received in the form of a function address table (FAT) by the rule receiver.

8. The sensor node of claim 7, wherein the updater moves the execution codes beginning with a function execution code having the largest memory address when the execution codes are moved in a direction in which a memory address increases, and moves the execution codes beginning with a function execution code having the smallest memory address when the execution codes are moved in a direction in which a memory address decreases.

9. The sensor node of claim 7, wherein the updater modifies a function call code included in the execution codes according to a function start address changed by the movement of the execution codes.

10. The sensor node of claim 9, wherein the updater updates the previously stored execution codes by adding an additional execution code downloaded from the update server to the previously stored execution codes.

11. The sensor node of claim 6, wherein the rule receiver and the updater are included in a bootloader of the sensor node.

12. The sensor node of claim 6, wherein the previously stored execution codes are stored in an application flash section.

13. A sensor node update method performed in an update server, comprising:
managing execution codes for a plurality of sensor nodes included in a sensor network;
comparing the managed existing execution codes with an update execution code required for a new function update of the sensor nodes, and generating an update rule to minimize transmission of the execution code where the update rule is in the form of a function address table (FAT) containing starting and ending addresses of the existing execution code and the update execution code; and
causing a corresponding sensor node to download the generated update rule,
wherein the rule generating generates the update rule in the form of a modification table (MT) including information about a memory requiring code modification based on the result of the simulation performed in the virtual node where the modification table includes addresses of bytes to be modified.

14. The sensor node update method of claim 13, further comprising simulating a function update in a virtual node according to the generated update rule.

15. The sensor node update method of claim 14, wherein the generating generates one or more update rules and the causing of the download includes selecting an update rule involving the least amount of transmission from among the generated one or more update rules according to the result of the simulation, and causing the sensor node to download the update rule.

16. A sensor node update method performed in a sensor node, comprising:
receiving an update rule from an update server, where the update rule is in the form of a function address table (FAT) containing starting and ending addresses of the existing execution code and the update execution code and is generated by comparing existing execution codes with an update execution code required for a new function update of the sensor node to minimize transmission of the execution code; and
interpreting the received update rule and updating previously stored execution codes,
wherein the update rule is in the form of a modification table (MT) including information about a memory requiring code modification based on the result of the simulation performed in the virtual node where the modification table includes addresses of bytes to be modified.

17. The sensor node update method of claim 16, wherein the updating of the previously stored execution codes includes:
interpreting the received update rule having the form of a function address table (FAT), and moving the previously stored execution codes of respective functions in a memory space; and
modifying a function call code included in the execution codes according to a function start address changed by the movement of the execution codes.

18. The sensor node update method of claim 17, wherein the updating of the previously stored execution codes further includes:
receiving an additional execution code from the update server; and
updating the previously stored execution codes by adding the received additional execution code to the previously stored execution codes.

* * * * *